United States Patent [19]
Shibata

[11] Patent Number: 5,631,556
[45] Date of Patent: May 20, 1997

[54] ROTATION SENSOR DEVICE AND METHOD OF MANUFACTURING THE SAME INCLUDING A DOUBLED UP MOUNTING BRACKET FOR ELECTRICAL CONTACT

[75] Inventor: Harumasa Shibata, Himeji, Japan

[73] Assignee: Mitsubishi Denki Kabushiki Kaisha, Tokyo, Japan

[21] Appl. No.: 493,107

[22] Filed: Jun. 20, 1995

[51] Int. Cl.$^6$ .................... G01P 3/48; H01F 7/06
[52] U.S. Cl. ............................ 324/174; 29/607
[58] Field of Search ..................... 324/173, 174, 324/207.25, 260, 262, 207.2, 207.21; 29/846, 848, 595, 607, 608

[56] References Cited

U.S. PATENT DOCUMENTS

| | | | |
|---|---|---|---|
| 4,164,071 | 8/1979 | Kruzich | 29/848 X |
| 5,010,263 | 4/1991 | Murata | 324/207.2 X |
| 5,121,289 | 6/1992 | Gagliardi | 324/207.2 X |
| 5,414,355 | 5/1995 | Davidson et al. | 324/207.2 |
| 5,418,455 | 5/1995 | Takaishi et al. | 324/207.21 |
| 5,488,294 | 1/1996 | Liddell et al. | 324/207.21 |

FOREIGN PATENT DOCUMENTS

| | | |
|---|---|---|
| 9216264 | 3/1993 | Germany . |
| 5302932 | 11/1993 | Japan . |

OTHER PUBLICATIONS

Klaus Fischer, Rotation Sensor Device Using a Differential–Hall–IC, Apr. 1991, pp. 86, 95–97.

*Primary Examiner*—Sandra L. O'Shea
*Assistant Examiner*—Roger Phillips
*Attorney, Agent, or Firm*—Sughrue, Mion, Zinn, Macpeak & Seas

[57] ABSTRACT

A rotation sensor device capable of detecting rotation speed of a rotatable magnetic member with high accuracy and reliability even in a low rotation speed range and a method of manufacturing the same through simplified process. As a means for detecting a rotation frequency of a toothed-wheel-like rotatable magnetic member (100), a permanent magnet (25) and a magneto-electric conversion element (22) are used. Conductors (24) having these elements (22; 25) mounted at a tip end portion is embedded integrally in a base (23) of a resin material through an insert molding process such that the elements (22; 25) and those portions of the conductors which constitute mounting electrodes are exposed at least partially on the surface of the base (23). Electronic parts (26) are packaged on the mounting electrode portions (24a).

13 Claims, 5 Drawing Sheets

ROTATION SENSOR DEVICE AND METHOD OF MANUFACTURING THE SAME INCLUDING A DOUBLED UP MOUNTING BRACKET FOR ELECTRICAL CONTACT

BACKGROUND OF THE INVENTION

1. Field of the Invention

The present invention relates to a rotation sensor device for detecting a rotation state (i.e., rotation speed or rotation number) of a rotating magnetic member formed in a shape such as, for example, that of a toothed wheel. The invention is further concerned with a method of manufacturing such rotation sensor device.

2. Description of Related Art

For having a better understanding concerning the technological background of the present invention, description will first be directed to a conventional rotation sensor device known heretofore.

FIG. 7 is a sectional view showing a conventional rotation sensor device. Referring to the figure, the rotation sensor device generally denoted by a reference numeral 14 is comprised of a rod-like magnetic core 4 and a coil 2 wound around the magnetic core 4 with a bobbin 3 being interposed therebetween, wherein outer peripheral surface of the coil 2 as a whole is covered with a casing 1 which is formed of a resin by molding. The magnetic core 4 has a tip end portion which projects outwardly from the casing 1 and Which is disposed in opposition to a toothed-wheel-like rotatable magnetic member (also referred to as the toothed magnetic disk) 100 which is mounted on, e.g. a shaft whose rotation state is to be detected. Disposed on the other end portion of the magnetic core 4 are a bias magnet 5 and a spacer 6 for completing a magnetic circuit. The bias magnet 5 and the spacer 6 are fixedly held in place by means of a grommet 7 which is made of a rubber. Wires (not shown) led out from the coil 2 are connected to terminal fittings 8 which in turn are connected to an external circuit by way of lead wires 10 and a connector 12. A rear end portion of the rotation sensor device 14 is enclosed by a cover 9. An O-ring 11 is provided for ensuring dust-proof installation of the rotation sensor device.

FIG. 8 shows in a block diagram an apparatus for measuring the rotation speed of the toothed magnetic disk 100 on the basis of the output of the rotation sensor device 14. Referring to the figure, the rotation sensor device 14 is connected to a computer unit 17 via a filter circuit 15 provided for noise elimination and a Schmitt trigger circuit 16 which is composed of comparator and switching circuitries.

Next, operation of the apparatus described above will be considered. By virtue of such arrangement of the rotation sensor device 14 that the magnetic core 4 and the spacer 6 are disposed closely adjacent to both lateral surfaces of the bias magnet 5, respectively, as can be seen in FIG. 7, and that the coil 2 is wound around the magnetic core 4, there is induced in the coil 2 an AC voltage in accompanying the rotation of the toothed magnetic disk 100 disposed in the vicinity of the free end of the magnetic core 4. The AC voltage as induced is then outputted onto the lead wire 10 connected to the external circuit.

More specifically, the AC output voltage is supplied to the filter circuit 15 to undergo noise elimination and thereafter converted into a voltage signal of a pulse-like waveform by the Schmitt trigger circuit 16. The computer unit (such as microcomputer) 17 calculates the period of the pulse signal (or counts the number of pulses) to thereby arithmetically determine the rotation number or speed (rpm) of the rotatable magnetic toothed disk 100.

The conventional rotation sensor device as well as the rotation speed measuring system described above suffers from a problem that when the toothed magnetic disk 100 whose rotation state is to be detected is rotating at a low speed, it becomes difficult to detect the rotation of the disk 100 with reasonably high accuracy and reliability.

More specifically, as is known as the Faraday's law of electromagnetic induction, the electromotive force induced in the rotation sensor circuit by a changing magnetic field generated by the toothed magnetic disk 100 is equal to the negative of the rate of change of the magnetic flux linkage for the circuit. Thus, when the rotation speed of the toothed magnetic disk 100 becomes low, magnitude of the output voltage of the rotation sensor device decreases proportionally, which in turn means that the S/N ratio (signal-to-noise ratio) of the sensor output signal becomes small, to incur degradation in the accuracy of the detection of the rotation speed.

SUMMARY OF THE INVENTION

In the light of the state of the art described above, it is an object of the present invention to provide an improved rotation sensor device whose output voltage level can be maintained at a predetermined level regardless of change in the rotation speed of a rotatable toothed magnetic disk and which can thus detect the rotation speed (rpm) with high accuracy and reliability even when the rotation speed is low.

Another object of the present invention is to provide a rotation sensor device of the type mentioned above which can be manufactured inexpensively in a simplified structure while assuring a high reliability of operation.

Yet another object of the present invention is to provide a method of manufacturing the rotation sensor device mentioned above.

In view of the above and other objects which will become apparent as the description proceeds, there is provided according to a first aspect of the present invention a rotation sensor device for detecting a rotation state of a rotatable magnetic member, which sensor device includes a magneto-electric conversion element for detecting change of magnetic flux which takes place as the rotatable magnetic member rotates, a base made of a resin material for holding at least the magneto-electric conversion element, insert conductors embedded integrally in the base through an insert molding process, the insert conductors being partially and locally exposed on a surface of the base, the magneto-electric conversion element being electrically connected to the insert conductors, exposed mounting electrodes each formed at least partially by the exposed portions of the insert conductors by bending corresponding portions of the insert conductors in a doubled-up structure, at least an electronic part mounted on the exposed mounting electrodes and electrically connected to the magneto-electric conversion element, and a connector portion having terminal electrodes formed by end portions of the insert conductors.

In a preferred mode for carrying out the invention, the magneto-electric conversion element may be comprised of a Hall element.

In another preferred mode for carrying out the invention, the magneto-electric conversion element may be comprised of a magneto-resistance element.

In yet another preferred mode for carrying out the invention, the electronic part may be comprised of a noise elimination filter circuitry and a signal shaping circuitry for shaping an output signal of the magneto-electric conversion element into a pulse signal.

In a further preferred mode for carrying out the invention, the rotatable magnetic member may be implemented in the form of a toothed wheel.

By employing the Hall element or magneto-resistance element (i.e., element whose resistance changes under influence of a magnetic field) as the magneto-electric conversion element (i.e., magnetism-to-electricity conversion element), the output electric signal of the rotation sensor device becomes proportional to the absolute value of the magnetic flux density independent of the rotation speed of the rotatable magnetic member whose rotation is to be monitored. Thus, it is possible to detect the rotation of the rotatable magnetic member even when it is rotating at a low speed, whereby the problem from which the conventional rotation sensor device suffers can successfully be overcome.

Further, by embedding the insert conductor in the base made of a resin through the insert molding process (i.e., the process for embedding or placing the electric conductor strip in the resin concurrently upon molding the base), the manufacturing method can be simplified, profitably to automatic manufacturing of the rotation sensor device.

Besides, because the major portion of the insert conductor strip except for those portions which constitute the electronic part mounting portions, respectively, are embedded within the resin base, there can be assured an elongated use life of the rotation sensor device.

Furthermore, because the electronic part mounting portions are not covered with the resin, reflow soldering can easily be carried out by making use of the surrounding resin material as the resist, which is also advantageous for realization of automated manufacturing of the rotation sensor device because mounting of the electronic parts on the external surface of the rotation sensor device can be much facilitated.

Additionally, owing to the doubled-up structure of the exposed mounting electrode, stress due to thermal contraction of the base material upon soldering can be absorbed by the doubled-up portion, whereby mechanical rigidity of the rotation sensor device can be enhanced.

According to a still further preferred mode for carrying out the invention, the rotation sensor device may further include a permanent magnet interposed in a magnetic path of the rotatable magnetic member and the magneto-electric conversion element for completing a magnetic circuit, wherein the magneto-electric conversion element is bonded to a top surface of the permanent magnet by a bonding agent interposed between the permanent magnet and the magneto-electric conversion element.

With the structure of the rotation sensor device described above, the magnetic circuit constituted by the permanent magnet, the magneto-electric conversion element and the rotatable magnetic member can remain stable even under the influence of vibration.

In a yet further preferred mode for carrying out the invention, the bonding agent may be made of a composition capable of exhibiting resiliency even after the bonding agent has been hardened or cured.

By securing fixedly the magneto-electric conversion element on the permanent magnet by using the bonding agent which exhibits resiliency even in the hardened or curved state, stress which the magneto-electric conversion element undergoes can be mitigated.

In a further preferred mode for carrying out the invention, the permanent magnet may be embedded in the base through an insert molding process with the top surface of said permanent magnet being exposed on the surface of the base.

By securing the permanent magnet to the base made of a resin by resorting to the insert molding, the manufacturing process can be much simplified when compared with the case where a bonding agent or adhesive is used for securing the permanent magnet, whereby the rotation sensor device can be manufactured inexpensively in a rigid structure with high yield. Besides, operation reliability of the rotation sensor device can be enhanced.

Further provided according to a second aspect of the present invention is a method of manufacturing a rotation sensor device for detecting a rotation state of a rotatable magnetic member, which method comprises the steps of forming an insert conductor strip having individual conductors interconnected by joint portions in a predetermined pattern by a press working, forming exposed mounting electrode portions by bending predetermined portions of the insert conductors in a doubled-up structure, embedding the insert conductor strip formed by the press working in a base made of a resin material through an insert molding process and cutting away unnecessary ones of the joint portions, connecting a magneto-electric conversion element to the insert conductors for forming electric connection, mounting electronic parts to be externally packaged on the exposed mounting electrodes of the insert conductors at predetermined location thereof, and accommodating the base in a casing and thermally staking an open end portion of the casing to thereby secure the base and the casing to each other.

With the method described above, the manufacturing process can be simplified, while assuring high structural rigidity and operation reliability as well as extended use life of the finished rotation sensor device.

In a preferred mode for carrying out the manufacturing method mentioned above, recesses may be formed at locations corresponding to the joint portions of the insert conductor strip upon forming the base from a resin material through an insert molding process, wherein after embedding the insert conductor strip in the base through the insert molding process, unnecessary joint portions of the insert conductor strip may be cut away by inserting a tool through the corresponding recesses or apertures.

With the rotation sensor device manufacturing method mentioned above, the apertures or recesses can be made use of as the positioning means for positioning a tool when joint portions between individual conductors are cut away. Parenthetically, such joint portions are required for protecting the insert conductor strip against deformation when the conductor strip is secured to the base through the insert molding process. Besides, the aperture or recesses can be utilized as positioning means for mounting the electronic part onto the exposed mounting electrodes, whereby reflow soldering can be facilitated.

For carrying out the method described above, similar recesses may be formed in said base at positions corresponding to the exposed mounting electrode portions.

By providing the apertures or recesses in correspondence to the exposed mounting electrodes, respectively, heat-shock withstanding capability of the bond formed between the electronic part and the electrode can be enhanced, which contributes to realization of high reliability of the rotation sensor device.

The present invention is also directed to an apparatus for measuring a rotation speed of a rotatable member such as a shaft. Thus, there is provided according to a third aspect of the invention an apparatus which includes a toothed magnetic disk fixedly mounted on the rotatable member, a rotation sensor device disposed in opposition to the toothed magnetic disk mounted on the rotatable member, shaping circuit means connected to the output of the rotation sensor device for shaping output signal of the rotation sensor device to thereby generate a pulse signal, and arithmetic means for determining the rotation speed of the rotatable member on the basis of the pulse signal, wherein the rotation sensor device is comprised of a magneto-electric conversion element for detecting change of magnetic flux which takes place as the toothed magnetic disk rotates, a base made of a resin material for holding the magneto-electric conversion element, insert conductors embedded in the base through an insert molding process, the insert conductors being partially and locally exposed on a surface of the base, the magneto-electric conversion element being electrically connected to the insert conductors, exposed mounting electrode portions each formed at least partially by the exposed portion of the insert conductor by bending the portion in a doubled-up structure, at least an electronic part mounted on the exposed mounting electrode and electrically connected to the magneto-electric conversion element, and a connector portion having terminal electrodes formed by end portions of the insert conductors.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
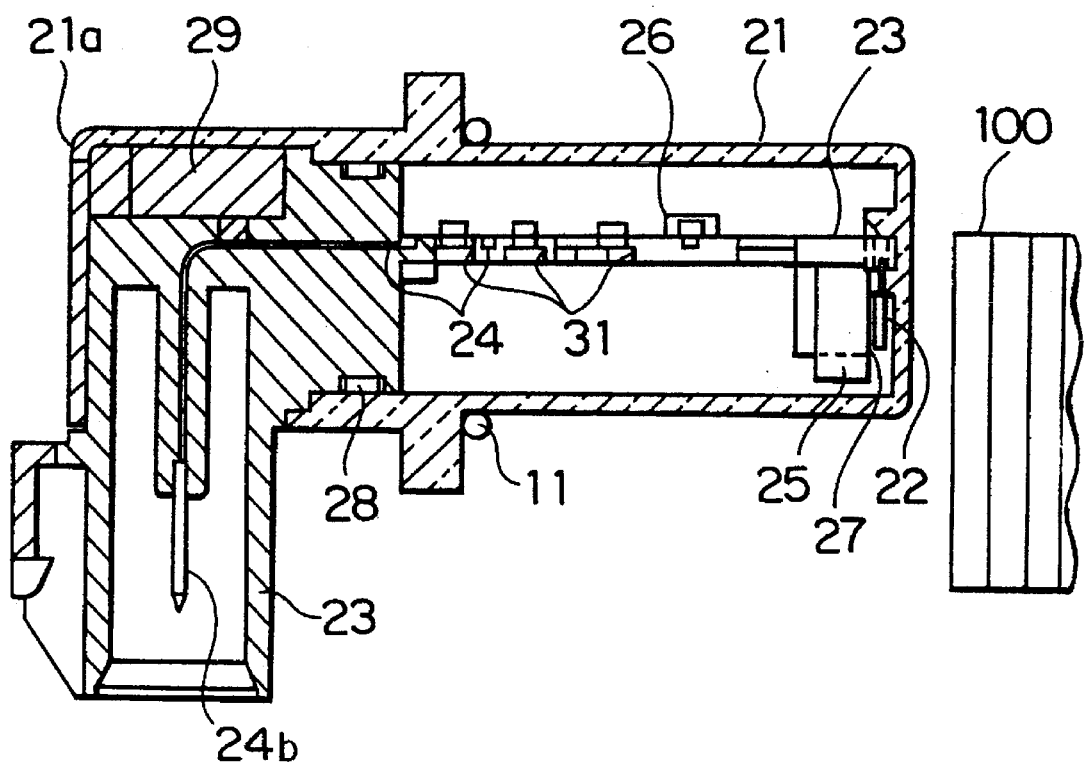
FIG. 1 is a side elevational view showing in section a rotation sensor device according to a first embodiment of the invention.

Now, the present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "front", "rear" and the like are words of convenience and are not to be construed as limiting terms.

Figure 2:
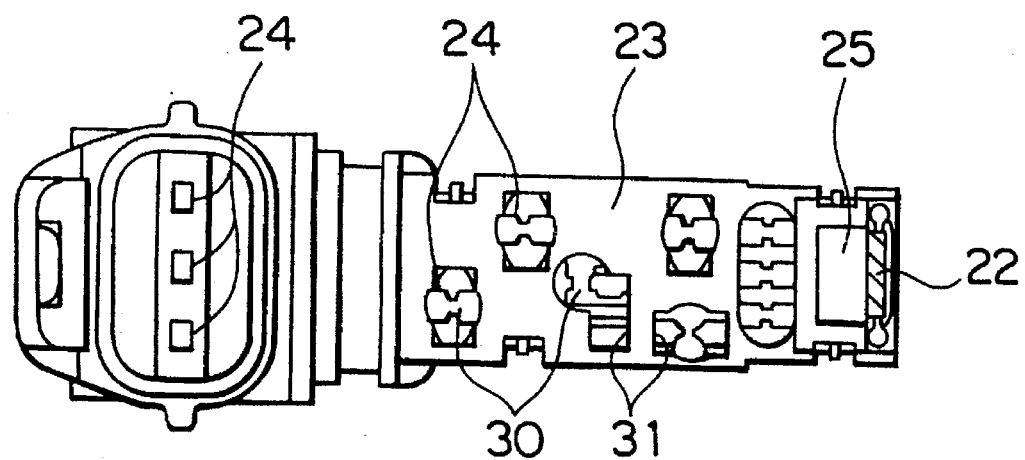
FIG. 2 is a bottom plan view of a base of the rotation sensor device at an intermediate stage of manufacturing the same.
Figure 3A:
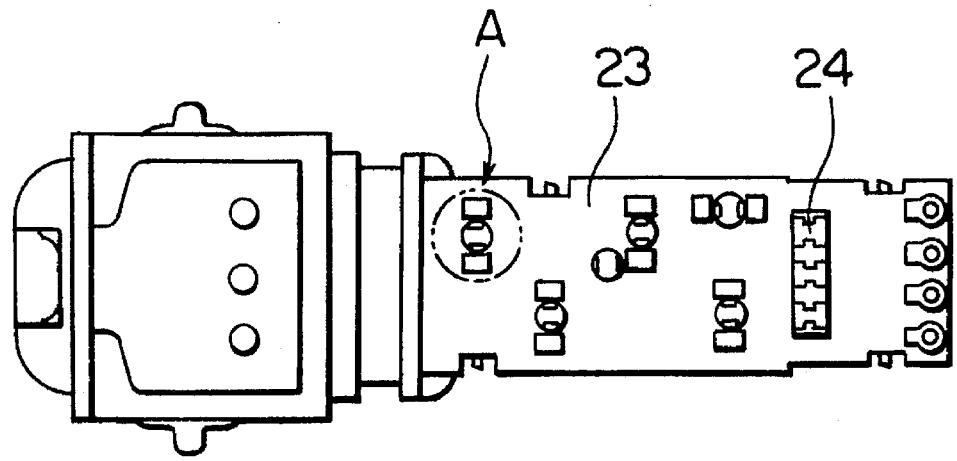
FIG. 3A is a top plan view showing the base of the rotation sensor device in the finished state.

A rotation sensor device according to a first embodiment of the present invention will be described by referring first to FIGS. 1, 2 and 3A–C, in which FIG. 1 is a side elevational view showing in section a rotation sensor device according to the instant embodiment of the invention, FIG. 2 is a bottom plan view of a base of the rotation sensor device at an intermediate stage of manufacturing the same, and FIG. 3A is a bottom plan view showing a base of the rotation sensor device in a finished state. Referring to the figures, a patterned conductor strip (which may also be referred to as an insert conductor strip) 24 is inserted or embedded in a molten resin in such a manner that a major portion of the patterned conductor strip 24 is covered with a resin upon forming of a base 23 from the resin. This process for embedding a major portion of the patterned conductor strip or other member in a body of resin forming the base 23 is referred to as an insert molding. The patterned conductor strip 24 includes individual conductors and joint portions for interconnecting them. Disposed fixedly at a tip end portion of the corresponding conductor is a permanent magnet 25 which is also secured to the base 23 by the insert molding, while a magneto-electric conversion element (i.e., magnetism-to-electricity converting device) 22 is disposed closely adjacent to the permanent magnet 25. The rotation sensor device is installed in such disposition that the permanent magnet 25 and the magneto-electric conversion element 22 are positioned in opposition to the rotatable toothed magnetic disk 100 which in turn is fixedly mounted on e.g. a rotatable shaft.

Exposed at predetermined surface locations of the base 23 are mounting electrodes 24a each of which is formed by bending a corresponding portion of the patterned conductor strip 24 in a doubled-up structure. Electronic parts 26 such as a capacitor and the like circuit components can be mounted on these exposed mounting electrodes 24a. More specifically, the patterned conductor strip 24 is so inserted or embedded in the base 23 through the insert molding process mentioned previously that only the mounting electrodes 24a, a land portion 24c for mounting thereon the magneto-electric conversion element 22 and connector terminal engaging portions 24b are exposed externally of the base 23. Further, a casing 21 is secured to the base 23 around a peripheral portion thereof, wherein an O-ring 28 is disposed between the base 23 and the casing 21 for preventing foreign particles from invading the interior of the rotation sensor device. Parenthetically, the rear end portion 21a of the casing 21 is thermally staked or caulked with inner space between the casing and the base being filled with a resin 29.

Figure 5:
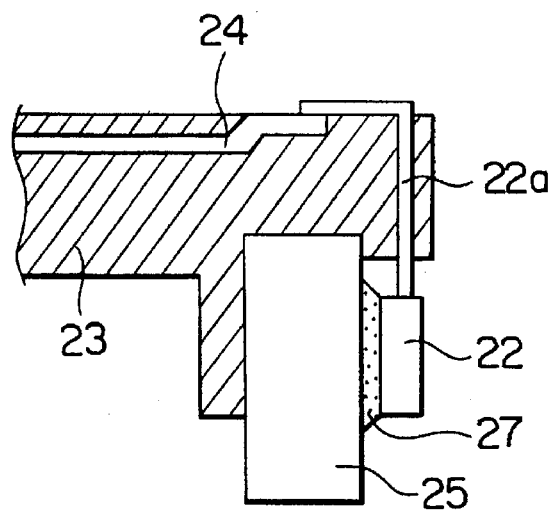
FIG. 5 is a fragmental enlarged view of the rotation sensor device showing a tip end portion of the same.

FIG. 5 is a fragmental enlarged view of the rotation sensor device showing a tip end portion of the base 23 at which the magneto-electric conversion element 22 is mounted. As can be seen in this figure, the magneto-electric conversion element 22 is mounted on the permanent magnet 25 through interposition of an RTV rubber (Room Temperature Vulcanization rubber) 27. The permanent magnet 25 is secured to the base 23 through the insert molding process as mentioned previously. Owing to the resiliency of the RTV rubber 27, vibration or deflection of the magneto-electric conversion element 22 otherwise brought about by external vibration can be suppressed to a minimum. The leads 22a of the magneto-electric conversion element 22 are connected to the land portions of the patterned conductor strip 24 embedded integrally in the base 23, as described hereinbefore.

Figure 6:
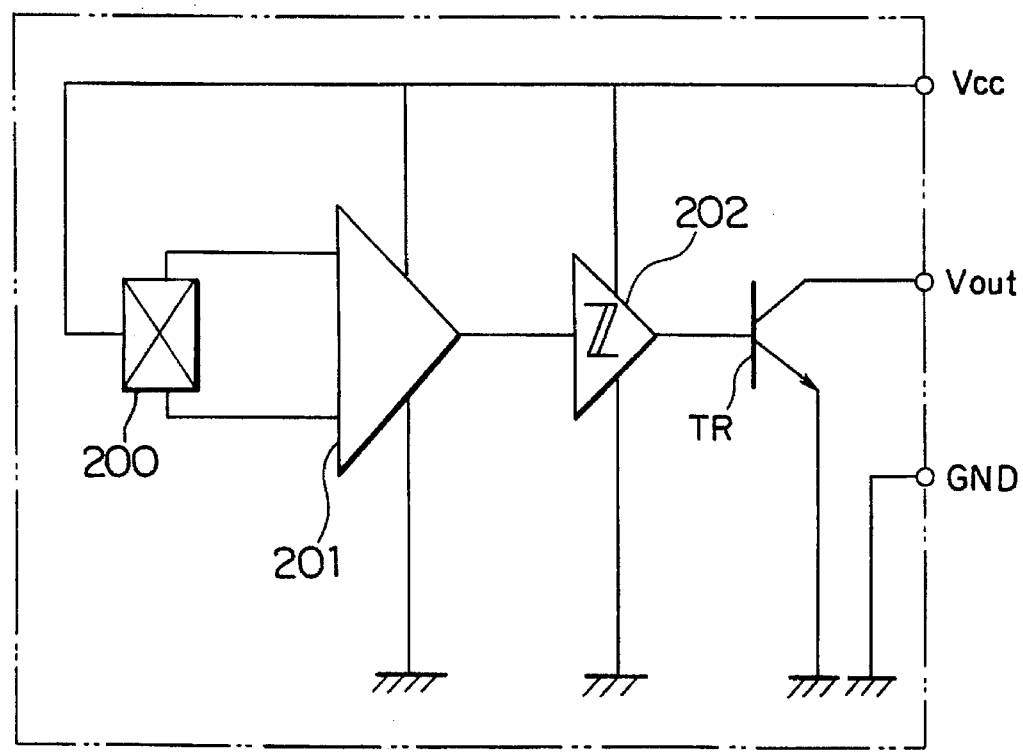
FIG. 6 shows in a circuit diagram an equivalent circuit configuration of a magneto-electric conversion element employed in the rotation sensor device.

FIG. 6 shows in a circuit diagram a circuit configuration of a magneto-electric conversion IC device in which a Hall element is made use of as the magneto-electric conversion element 22. Variation in the frequency of alternating magnetic field as brought about by change in the rotation speed of the toothed magnetic disk 100 is detected by the Hall element 200 as a corresponding voltage change. An analogue output signal of the Hall element 200 is amplified by a differential amplifier 201 to be subsequently converted into a rectangular waveform or pulse signal through a Schmitt trigger circuit 202. The pulse signal thus obtained is supplied to the externally mounted electronic circuit 26 for noise elimination via the lead 22a and an assigned conductor of the patterned conductor strip 24 and hence to a computer unit (not shown) via a connector (also not shown) to be processed for thereby detecting the rotation number or speed (rpm) of the rotatable toothed magnetic disk 100. As a modification of the illustrated embodiment, magneto-resistance element or the like may be employed in place of the Hall element 200. With the term "magneto-resistance element", it is intended to mean such an element whose resistance changes under influence of a magnetic field.

Figure 7:
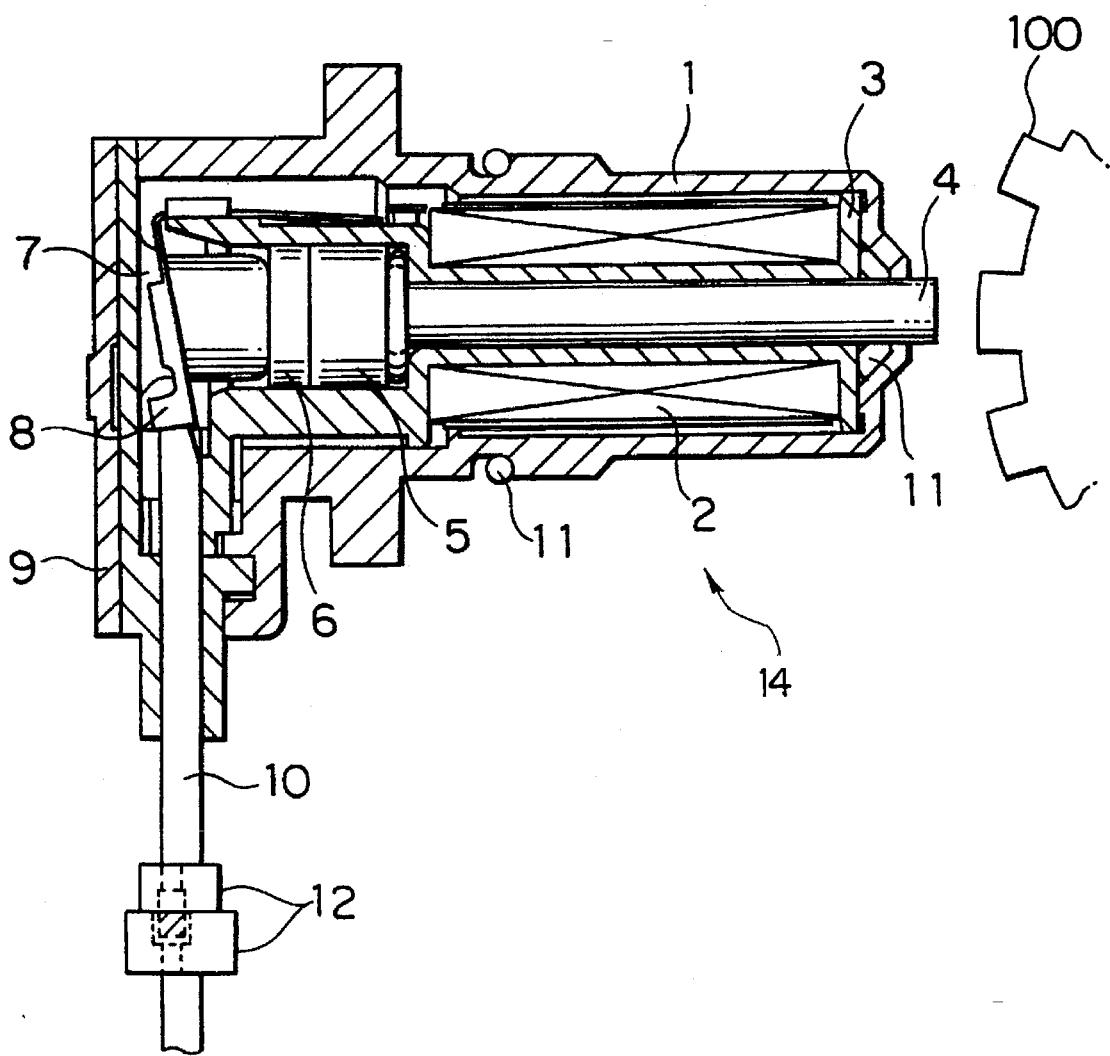
FIG. 7 is a sectional view showing a rotation sensor device known heretofore.
Figure 8:
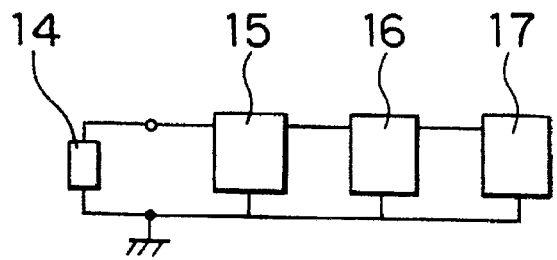
FIG. 8 is a block diagram showing only schematically a system for measuring a rotation speed of a rotating member by using a rotation sensor device.

Next, description will be directed to rotation detecting operation of the rotation sensor device according to the instant embodiment of the invention. As described previously, the magneto-electric conversion element 22 is composed of the Hall element or magneto-resistance element integrally combined with a Schmitt trigger and can perform switching operation between the states of logic "H" and "L" in response to change in the magnetic flux or field by following a predetermined hysteresis loop. Thus, the magneto-electric conversion element 22 is capable of detecting the rotation speed (rpm) of the rotatable toothed magnetic disk 100 in terms of a frequency with a detection output magnitude being maintained constant independent of changes in the rotation speed. Thus, when compared with the conventional rotation sensor device (shown in FIGS. 7 and 8), the S/N ratio of the output signal can be improved, which makes it possible to detect the rotation speed of the rotatable toothed magnetic disk 100 with high accuracy and reliability even in a range in which the rotation speed is low.

Further, in the rotation sensor device according to the instant embodiment of the invention, the insert conductors 24, the permanent magnet 25 and others are integrally secured to the base 28 made of a resin through the insert molding process mentioned previously. Thus, major portions of the insert conductors 24 are protected against environmental conditions, which contributes to elongation of the use life of the rotation sensor device.

Additionally, the O-ring 28 provided between the base 23 and the casing 21 can ensure air-tightness for the internals of the rotation sensor device.

Since the base 28 is inserted up to the tip end of the casing 21 which is thermally caulked or staked at the other end, with the caulked portion being internally covered with a resin 29, invasion of moisture and foreign particles into the inner space of the rotation sensor device can positively be prevented.

Furthermore, because the magneto-electric conversion element 22 is secured to the permanent magnet 25 by using the RTV rubber 27, the magnet circuit can be stabilized with the magneto-electric conversion element 22 being protected from mechanical stress.

Next, description will turn to a method of manufacturing a rotation sensor device according to an embodiment of the present invention.

Figure 4A:
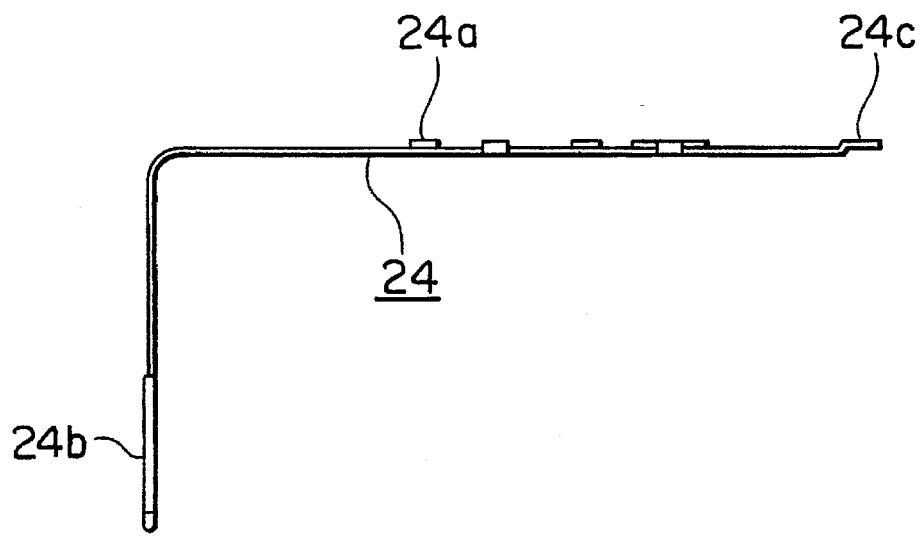
FIG. 4A shows in a side view an insert conductor strip blanked or patterned in a predetermined shape by a press working.
Figures 4B, 4C:
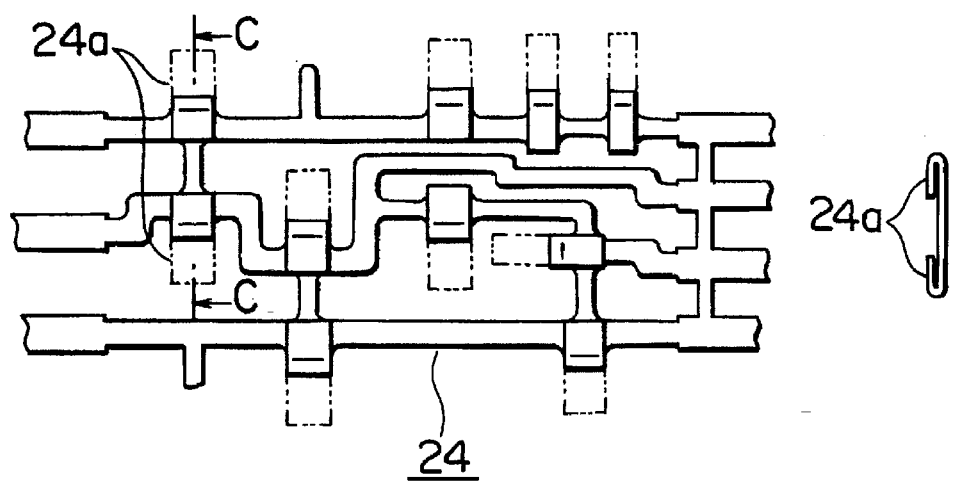
FIG. 4B is a top plan view of the same.
FIG. 4C is a sectional view of the same taken along a line C—C in FIG. 4B.

In a first step, a patterned conductor strip 24 composed of individual conductors interconnected by joint portions in a desired pattern is formed by blanking a hoop of brass wound in a roll-like form. In this connection, FIG. 4A shows in a side view a patterned conductor strip 24 as blanked in a predetermined shape. FIG. 4B is a top plan view of the same, and FIG. 4C is a sectional view of the same taken along a line C—C in FIG. 4B. As can be seen in FIGS. 4A, 4B and 4C, those portions of the patterned conductor strip 24 which are used for forming the mounting electrode portions 24a and the connector terminal engaging portions 24b are bent in predetermined shapes, respectively, to thereby form doubled-up portions by a press working.

The patterned conductor strip 24 processed in the manner described above is integrally secured to the base 23 formed of a resin through the insert molding process mentioned hereinbefore. At this juncture, it is to be noted that the permanent magnet 25 is also integrally secured to the base 23 by the insert molding. Subsequently, unnecessary joint portions of the patterned conductor strip 24 shown in FIG. 2 are cut away by press working. To this end, those portions of the base 23 at which joint portions 30 are to be cut away are formed with apertures or recesses 31 so that a die used for the cutting press work can easily be positioned relative to the joint portions 30 of the patterned conductor strip 24.

Figure 3B:
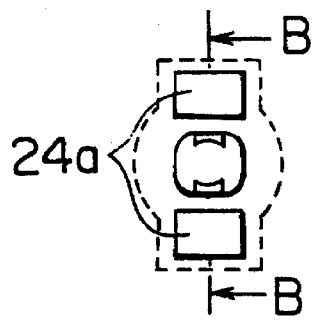
FIG. 3B is an enlarged view of a portion of the base shown as enclosed by a circle A in FIG. 3.
Figure 3C:
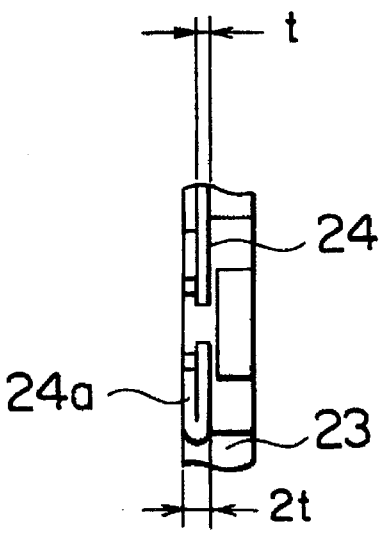
FIG. 3C is a sectional view taken along a line B—B in FIG. 3B.

FIG. 3A is a top plan view showing the base 23 at an intermediate manufacturing stage, FIG. 3B is an enlarged view of a portion of the base 23 shown as enclosed by a circle A, and FIG. 3C is a sectional view taken along a line B—B in FIG. 3B. As can be seen in these figures, the mounting electrode portions 24a of the patterned conductor strip 24 integrally secured to the base 23 by the insert molding constitute exposed land portions for mounting thereon electronic parts to be externally packaged. More specifically, each of the land portions is formed by bending the corresponding portion of the patterned conductor strip 24 so that the land portion has a thickness (2t) twice as large as that (t) of the patterned conductor strip 24 and exposed on the surface of the base 23 without being embedded in the resin material forming the base 23.

Subsequently, a layer of the RTV rubber 27 is coated over the permanent magnet 25, whereon the leads of the magneto-electric conversion element 22 are connected to the land portions 24c formed at the tip end portions of the corresponding insert conductors 24. The externally packaged electronic parts 26 such as capacitor, resistor and the like are then mounted on the mounting electrode portions 24a and secured thereto by reflow soldering.

Finally, the O-ring 28 is fitted in the O-ring groove of the base 23 which is then inserted into the casing 21 as deep as possible, whereon the rear edge portion 21a of the base 23 is thermally caulked. The caulked portion is then covered with a resin layer 29.

As will now be understood from the above description, in the rotation sensor device according to the present invention, the electronic parts mounting portions of the patterned conductor strips 24 are not covered with the resin forming the base 23 to thereby constitute the mounting electrode portions 24a for mounting thereon the electronic parts to be externally packaged, while the resin material surrounding the mounting electrode portions 24a can serve for the function of resistance for allowing the reflow soldering to be effectively carried out. The rotation sensor device according to the invention is profitably suited for an automatic large-scale production while assuring a high yield.

Besides, because the joint portions of the patterned conductor strips 24 which are required for maintaining the integrity of the patterned conductor strip 24 upon securing it to the base 23 through the insert molding can be cut away by inserting the die into the corresponding apertures or recess 31 formed in the base 23 after the insert molding, which is then followed by mounting of the electronic parts 26 to be externally packaged, the reflow soldering can easily be carried out by making use of the apertures 31.

Furthermore, since stress which the soldered portions undergo due to thermal contraction of the base material can be absorbed by the bent portions of the patterned conductor strips 24, stress making appearance during manufacturing as well as during the practical use of the rotation sensor device is dispersed whereby high reliability can be ensured for operation of the rotation sensor device as finished.

Additionally, by forming the apertures or recesses 31 in the vicinity of the mounting electrode portions 24a, stress to the soldered portions due to thermal contraction of the base material can be mitigated, whereby high reliability can be ensured for the rotation sensor device as the finished product.

Many modifications and variations of the present invention are possible in the light of the above techniques. It is therefore to be understood that within the scope of the appended claims, the invention may be practiced otherwise than as specifically described.

What is claimed is:

1. A rotation sensor device for detecting a rotational state of a rotatable magnetic member, comprising:
    a magneto-electric conversion element for detecting change of magnetic flux which takes place as said rotatable magnetic member rotates;
    a base made of a resin material for holding at least said magneto-electric conversion element;
    a base made of a resin material for holding at least said magneto-electric conversion element;
    insert conductors embedded integrally in said base using an insert molding process, said insert conductors being partially exposed on a surface of said base, said magneto-electric conversion element being electrically connected to said insert conductors;
    exposed mounting electrodes each formed by bending corresponding ones of said exposed portions of said insert conductors in a doubled-up structure, such that a respective mounting surface of the doubled-up structure of each of said exposed mounting electrodes lies along the surface of said base;
    at least one electronic part being mounted on at least one of said exposed mounting electrodes and being electrically connected to said magneto-electric conversion element; and
    a connector portion having terminal electrodes formed by end portions of said insert conductors.

2. A rotation sensor device according to claim 1, wherein said magneto-electric conversion element is comprised of a Hall element.

3. A rotation sensor device according to claim 1, wherein said magneto-electric conversion element is comprised of a magneto-resistance element.

4. A rotation sensor device according to claim 1, wherein said electronic part is comprised of a noise elimination filter circuit and a signal shaping circuit for shaping an output signal of said magneto-electric conversion element into a pulse signal.

5. A rotation sensor device according to claim 1, wherein said rotatable magnetic member is implemented in the form of a toothed wheel.

6. A rotation sensor device according to claim 1, further comprising:
    a permanent magnet interposed in a magnetic path of said rotatable magnetic member and said magneto-electric conversion element for completing a magnetic circuit, wherein said magneto-electric conversion element is bonded to a top surface of said permanent magnet by a bonding agent interposed between said permanent magnet and said magneto-electric conversion element.

7. A rotation sensor device according to claim 6, wherein said bonding agent is made of a composition capable of exhibiting resiliency even after said bonding agent has been hardened.

8. A rotation sensor device according to claim 1, wherein said permanent magnet is embedded in said base using an insert molding process with the top surface of said permanent magnet being exposed on the surface of said base.

9. An apparatus for measuring a rotational speed of a rotatable member, comprising:
    a toothed magnetic disk fixedly mounted on said rotatable member;
    a rotation sensor device disposed in opposition to said toothed magnetic disk mounted on said rotatable member;
    shaping circuit means connected to the output of said rotation sensor device for shaping an output signal of said rotation sensor device to thereby generate a pulse signal; and
    arithmetic means for determining the rotational speed of said rotatable member on the basis of said pulse signal;
    wherein said rotation sensor device comprises:
        a magneto-electric conversion element for detecting change of magnetic flux which takes place as said toothed magnetic disk rotates;
        a base made of a resin material for holding said magneto-electric conversion element;
        insert conductors embedded in said base using an insert molding process, said insert conductors being partially exposed on a surface of said base, said magneto-electric conversion element being electrically connected to said insert conductors;
        exposed mounting electrodes formed by bending said exposed portions of said insert conductors in a doubled-up structure, such that a respective mounting surface of the doubled-up structure of each of said exposed mounting electrodes lies along the surface of said base;
        at least one electronic part mounted on at least one of said exposed mounting electrodes, said at least one electronic part being electrically connected to said magneto-electric conversion element; and
        a connector portion having terminal electrodes formed by end portions of said insert conductors.

10. A method of manufacturing a rotation sensor device for detecting a rotational state of a rotatable magnetic member, comprising the steps of:
    forming an insert conductor strip having individual insert conductors interconnected by joint portions in a predetermined pattern using a press working;

forming exposed mounting electrode portions by bending predetermined portions of said insert conductors in a doubled-up structure;

embedding said insert conductor strip in a base made of a resin material using an insert molding process, such that a respective mounting surface of the doubled-up structure of each of said exposed mounting electrode portions is located along the surface of said base;

cutting away unnecessary ones of said joint portions;

forming an electric connection by connecting a magneto-electric conversion element to said insert conductors;

mounting electronic parts on said exposed mounting electrodes of said insert conductors at predetermined locations; and accommodating said base in a casing and thermally staking an open end portion of said casing to thereby secure said base and said casing to each other.

11. A method of manufacturing a rotation sensor device according to claim 10, wherein upon forming said base from a resin material using an insert molding process, recesses are formed at locations corresponding to said joint portions of said insert conductor strip, and wherein after embedding said insert conductor strip in said base through said insert molding process, unnecessary joint portions of said insert conductor strip are cut away by inserting a tool through said apertures.

12. A method of manufacturing a rotation sensor device according to claim 11, wherein recesses are formed in said base at positions corresponding to said exposed mounting electrode portions.

13. A method of manufacturing a rotation sensor device according to claim 10, wherein said electronic parts are mounted and secured onto said exposed mounting electrodes using a reflow soldering process.

* * * * *